(12) United States Patent
Bogdan (10) Patent No.: US 7,065,742 B1
(45) Date of Patent: Jun. 20, 2006

(54) SYSTEM AND METHOD FOR DYNAMICALLY PROCESSING DECLARATIVE LANGUAGE INSTANCE DATA

(75) Inventor: Jeffrey L. Bogdan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 688 days.

(21) Appl. No.: 09/895,472

(22) Filed: Jun. 29, 2001

Related U.S. Application Data (60) Provisional application No. 60/244,486, filed on Oct. 30, 2000, provisional application No. 60/244,769, filed on Oct. 31, 2000.

(51) Int. Cl.
*G06F 9/44* (2006.01)
*G06F 17/21* (2006.01)

(52) U.S. Cl. ...................... 717/106; 715/513

(58) Field of Classification Search ................ 717/136, 717/143–147; 715/513, 523; 345/744, 760; 707/5, 102, 103; 719/316
See application file for complete search history.

(56) References Cited

U.S. PATENT DOCUMENTS

| | | | | |
|---|---|---|---|---|
| 5,732,271 A | * | 3/1998 | Berry et al. ................ | 719/316 |
| 6,418,446 B1 | * | 7/2002 | Lection et al. ........... | 707/103 R |
| 6,476,828 B1 | * | 11/2002 | Burkett et al. ............. | 345/760 |
| 6,480,860 B1 | * | 11/2002 | Monday ..................... | 707/102 |
| 6,480,865 B1 | * | 11/2002 | Lee et al. ................... | 715/523 |
| 6,738,077 B1 | * | 5/2004 | Wendker et al. ............ | 345/744 |
| 6,763,499 B1 | * | 7/2004 | Friedman et al. ........... | 715/513 |
| 6,880,129 B1 | * | 4/2005 | Lee et al. ................... | 715/763 |
| 2002/0038320 A1 | * | 3/2002 | Brook ........................ | 707/513 |
| 2002/0078255 A1 | * | 6/2002 | Narayan .................... | 709/316 |
| 2002/0123993 A1 | * | 9/2002 | Chau et al. ................... | 707/5 |
| 2002/0133809 A1 | * | 9/2002 | Hills .......................... | 717/136 |

OTHER PUBLICATIONS

World Wide Web Consortium, Namespaces in XML, Jan. 14, 1999.*
Norman Walsh, "A Technical Introduction to XML", Oct. 3, 1998.*

* cited by examiner

*Primary Examiner*—Kakali Chaki
*Assistant Examiner*—Trenton J. Roche
(74) *Attorney, Agent, or Firm*—Christensen O'Connor Johnson Kindness PLLC (57) ABSTRACT

A method and system for dynamically processing instance data are provided. A namespace manager obtains declarative language instance data including tags, attributes and values for generating user interface objects. The instance data refers to one or more modules registered with a namespace manager in which the modules include meta-data defining one or more class definitions in a class hierarchy. Each class definition defines one or more properties of the class and references to a superclass/subclass(es) for the class. Thereafter, the namespace manager validates the instance data according to the class hierarchy and generates object code for instantiating an object hierarchy having classes, properties and values corresponding to the instance data.

34 Claims, 8 Drawing Sheets

SYSTEM AND METHOD FOR DYNAMICALLY PROCESSING DECLARATIVE LANGUAGE INSTANCE DATA

CROSS-REFERENCE TO RELATED APPLICATIONS

This application claims the benefit of U.S. Provisional Application No. 60/244,486, filed Oct. 30, 2000 and U.S. Provisional Application No. 60/244,769, filed Oct. 31, 2000. U.S. Provisional Application Nos. 60/244,486 and 60/244,769 are specifically incorporated by reference herein.

FIELD OF THE INVENTION

In general, the present application relates to computer software, and in particular, to a system and method for providing dynamic validation and instantiation of objects described in an extensible declarative language.

BACKGROUND OF THE INVENTION

Figure 1:
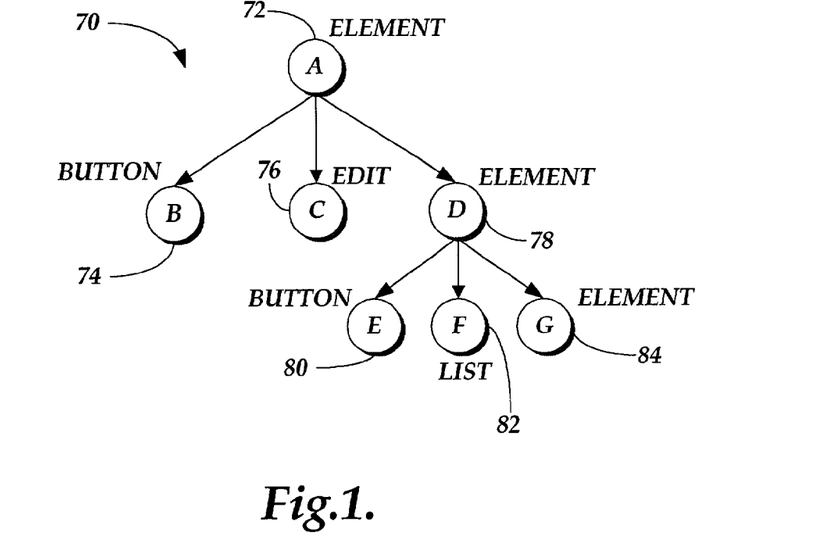
FIG. 1 is a block diagram of an object hierarchy illustrating a parent/child relationship of various UI objects in accordance with the present invention.

Generally described, many software applications utilize user interfaces ("UI"), such as a graphical user interface, to present and obtain data from a user. A UI generally contains a number of graphical objects whose characteristics and relationship to other UI objects can be defined in terms of an object hierarchy. FIG. 1 is a block diagram of a UI object hierarchy 70 illustrating various objects that may be instantiated in a UI. As illustrated in FIG. 1, the object hierarchy 70 may include an element object 72 that includes a button object 74, an edit box object 76, and an embedded element object 78 that includes a button object 80, a list box object 82 and another element button 82. The object hierarchy 70, in turn, relates to the UI displayed to the user on a computer display. In a typical configuration, a software application utilizes functionality provided by an underlying operating environment to generate each of the application's UI objects.

In one approach to generating application UI, a software application specifies the various classes, properties, and values of the UI objects and their relationship with one another in a programmatic manner, generally referred to as a programmatic UI. A programmatic UI can be implemented by a software developer specifying attributes of each object within the UI in the application's software code. Accordingly, the operating environment obtains the programmatic UI information from the software code and utilizes the information to generate the various application UI. Programmatic UI are inefficient in not facilitating the modification of the various objects utilized in the UI after they have been generated. Moreover, a programmatic UI further does not facilitate the incorporation of all or portions of the software application into a larger, more encompassing software application.

In another approach to generating application UI, a software application specifies the classes, properties, and values of the objects of the UI and their relationship with one another in a declarative manner, generally referred to as a declarative UI. A declarative UI is implemented by a software developer utilizing a declarative language to specify the tags, attributes, and values that correspond to the classes, properties and values of the objects within the UI. However, unlike programmatic languages, declarative languages conforming to the Standard Generalized Markup Language (SGML), such as the Hypertext Markup Language (HTML) and Extensible Markup Language (XML), are configured to allow the UI objects to be instantiated at run-time by the operating environment. Accordingly, a declarative UI provides more flexibility to the software developer to vary UI objects without requiring a modification of the application software code.

Figure 2:
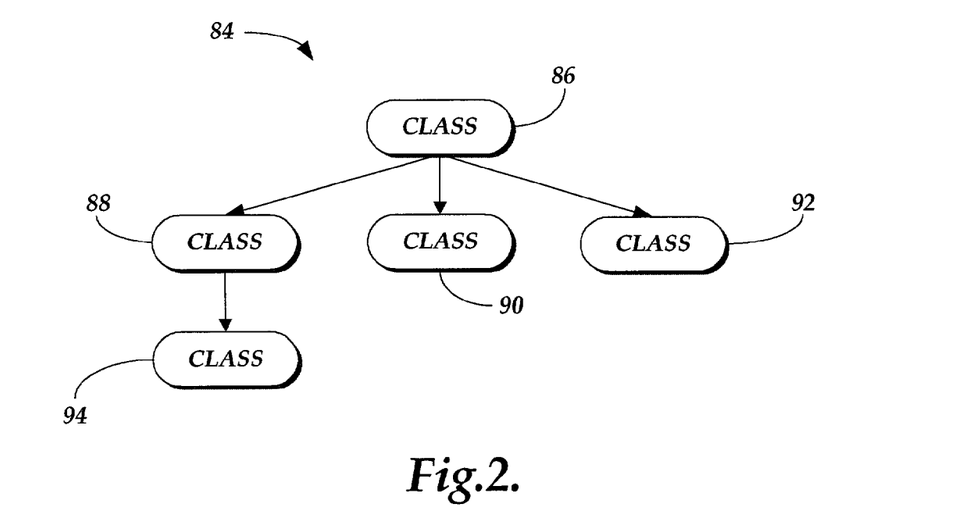
FIG. 2 is a block diagram of a class hierarchy illustrating a superclass/subclass relationship of various UI classes in accordance with the present invention.

Some declarative languages, such as HTML, utilize a class hierarchy, such as a defined schema, for validating the declarative UI data generated by the software application. One skilled in the relevant art will appreciate that a schema is similar to template that defines the properties of a class in the hierarchy and its relationship to other classes within the hierarchy. FIG. 2 is a block diagram of a class hierarchy 84 illustrating the relationship of classes as superclasses and subclasses of one another. As illustrated in FIG. 2, the class hierarchy 84 includes a class 86 that is at the top node of the class hierarchy. This class is a superclass of classes 88, 90, 92, which are defined to be subclasses of the class 86. Similarly, class 88 is a superclass of class 94, which a subclass of class 88. Each class is defined as having various properties that may be specified. Additionally, a subclass generally inherits all the properties of its superclass.

Figure 3:
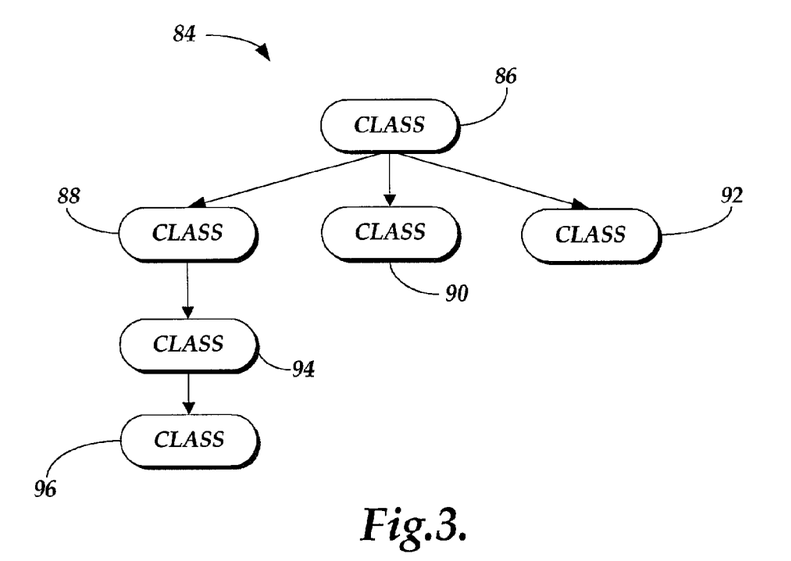
FIG. 3 is a block diagram of the class hierarchy of FIG. 2 illustrating an extended class in accordance with the present invention.

In one conventional approach to processing some declarative languages, such as HTML, a parser within a software application generating the UI objects, such as an operating environment, utilizes the defined schema to validate whether the various tags and attributes specified within an HTML specification are valid. Although the use of declarative languages facilitate the run-time specification of UI display objects, declarative languages that rely on a defined schema prevents a software developer from modifying or personalizing the class hierarchy. For example, as applied to a declarative UI, a software developer may wish to define additional properties to a class of UI objects or modify existing object properties, generally referred to as extensibility. FIG. 3 is a block diagram of the class hierarchy 84 of FIG. 2 that includes a new subclass 96 of class 94. However, it will be readily understood by one skilled in the relevant art that some conventional declarative languages, such as HTML, do not provide for developer extensibility and become deficient for facilitating dynamic, extensible UI object specification.

Other declarative languages, such as XML, allow a developer to modify the defined schema provided by the operating environment by specifying additional classes having within a schema as illustrated in the "extended" class hierarchy of FIG. 3. Accordingly, a developer, through the software application, could utilize the extended class definitions to specify XML tag, attribute and value data that would correspond to the new class(es). With regard to the use of an extensible declarative language, such as XML, for generation of software application UI, software applications can create customized user interfaces by extending the base UI class hierarchy to define customized classes and generating instance data that specifies tag, attribute and value data related to the extended class Similar to other declarative languages, the conventional processing of XML instance data requires the instance data to be validated by an XML parser to ensure that the tag, attribute, value data being specified conforms to the class definition defined in the XML schema. More specifically, the XML parser processes the instance data according to the base XML schema to generate the class hierarchy utilized to validate the instance data. In the event the instance data includes tag, attribute and value data related to an extended class, the conventional XML instance data processing procedure requires the instance data to refer to an extended schema that defines the new class(es).

One skilled in the relevant art will appreciate that conventional extensible declarative languages, such as XML, require an extended schema to include not only the additional class(es) being defined and its related properties, but all the other classes associated with the original class hierarchy derived from the base schema. However, requiring an extended schema to include all the classes and their relationship (e.g., superclass/subclass) cab become inefficient and redundant. For example, assume a class hierarchy includes a node class having four properties and two subclasses that each has 5 properties. In order to define an extended class hierarchy that creates a third subclass of the node class having only one property, the extended schema would have to include the definitions of the original node class and the two subclasses as well as the newly added third subclass. With regard to the above example, in the event the original class hierarchy is subsequently modified to alter one of the classes (e.g., the node class or one of the subclasses) not associated with extended class, the extended schema would thereafter be invalid because it did not confirm the most current version of the class hierarchy. Thus, the extended XML would have to be modified each time the base schema is modified, even if the modification to the base schema would not affect the classes in the extended XML schema. Thus, the conventional declarative language method for validating instance data becomes inefficient.

In addition to the deficiencies associated with extensible schema for extensible declarative languages, such as XML, conventional declarative language processing methods do not provide a mechanism for directly instantiating the various objects from the instance data. With reference to an embodiment for instantiating UI objects, the specification of tag, attribute and value instance data does not generate the UI objects corresponding to the data. Instead, a parser validates the data and relies on the application supplying the instance data to cause the validated objects to be generated by the operating environment in a manner defined by the application. Accordingly, the conventional approach is further deficient in not having a central processing method that can also instantiate validated objects.

Thus, there is a need for a method and system for dynamically processing declarative language instance data to validate and instantiate a user interface object hierarchy.

SUMMARY OF THE INVENTION

A method and system for dynamically processing instance data are provided. A namespace manager obtains declarative language instance data including tags, attributes and values for generating user interface objects. The instance data refers to one or more modules registered with a namespace manager in which the modules include meta-data defining one or more class definitions in a class hierarchy. Each class definition defines one or more properties of the class and references to a superclass/subclass(es) for the class. Thereafter, the namespace manager validates the instance data according to the class hierarchy and generates object code for instantiating an object hierarchy having classes, properties and values corresponding to the instance data.

In accordance with an aspect of the present invention, a method for dynamically processing declarative language instance data is provided. A dynamic processing system obtains instance data that includes a reference to one or more namespace modules and tag, attribute and value data. The dynamic processing system also obtains one or more namespace modules referenced in the instance data and generates a class hierarchy from meta-data included in the one or more namespace modules. The dynamic processing system then validates the tag, attribute and value data according to the class hierarchy. Finally, the dynamic processing system generates an object code operable to instantiate an object hierarchy corresponding to the tag, attribute and value data of the instance data.

In accordance with another aspect of the present invention, a system for processing declarative language instance data including a reference to one or more namespace modules and tag, attribute and value data is provided. The system includes a parser operable to obtain and parse the instance data. The system also includes a namespace manager operable to obtain and process the parsed instance data. The namespace manager processes the parsed instance data by validating the tag, attribute and value data and generates an object code corresponding to the validated tag, attribute and value data.

In accordance with a further aspect of the present invention, a method for processing declarative language instance data is provided. In accordance with the method, an application process issues instance data including a reference to one or more namespace modules and tag, attribute and value data. A dynamic processing process obtains the instance data and the one or more namespace modules referenced in the instance data. The dynamic processing process generates a class hierarchy from meta-data included in the one or more namespace modules. The dynamic processing process then validates the tag, attribute and value data according to the class hierarchy and generates an object code operable to instantiate an object hierarchy corresponding to the tag, attribute and value data of the instance data. The application process obtains the object code and instantiates an object hierarchy corresponding to the object code generated by the namespace processing process.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 13:
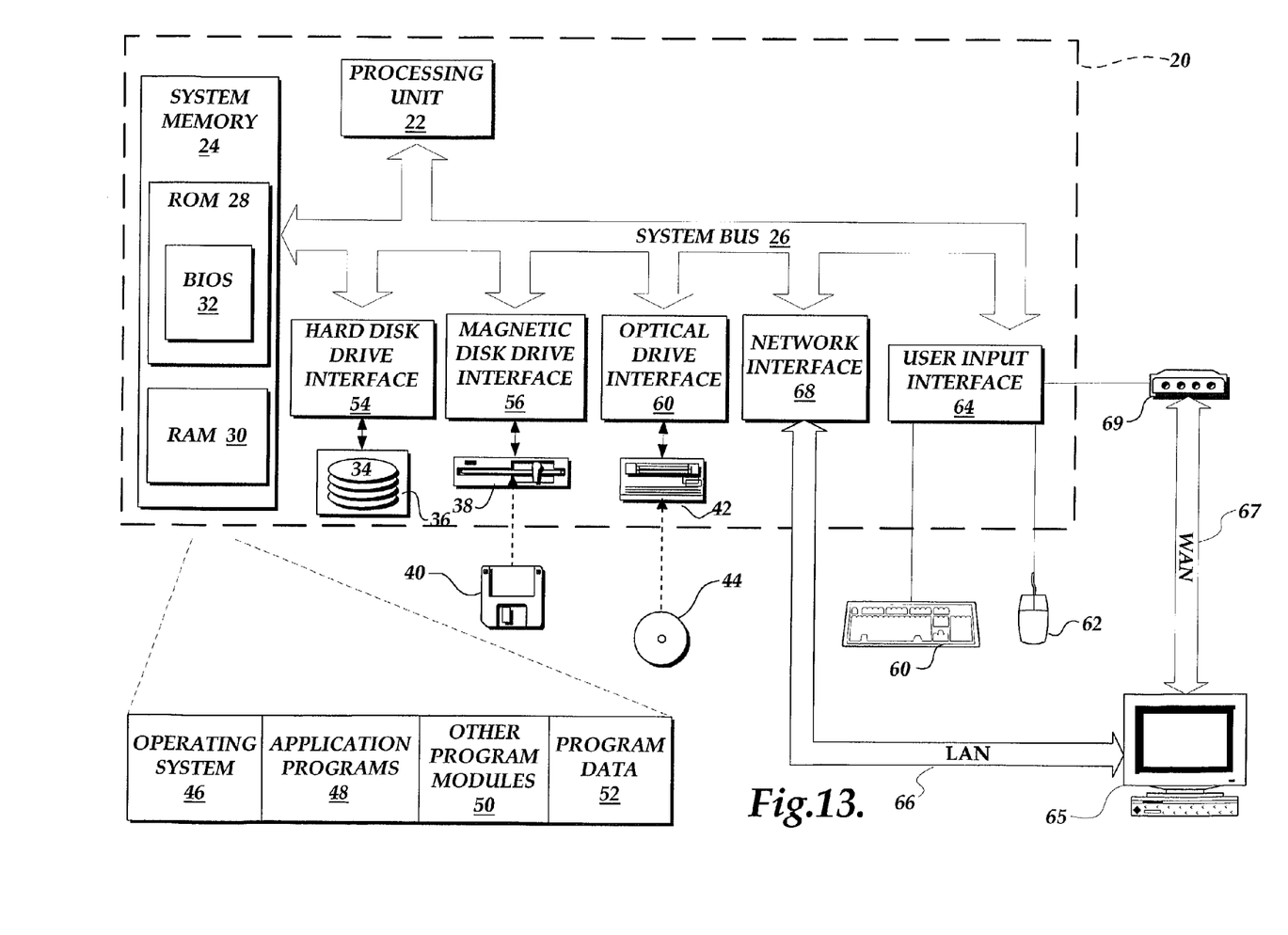
FIG. 13 is a block diagram of a suitable computer suitable in accordance with the present invention.

FIG. 13 illustrates an example of a suitable computing system environment in which the invention may be implemented. The computing system environment is only one example of a suitable computing environment and is not intended to suggest any limitation as to the scope of use or functionality of the invention. Neither should the computing environment be interpreted as having any dependency requirement relating to any one or combination of components illustrated in the exemplary operating environment.

The invention is operational in numerous other general purposes or special computing system environments or configurations. Example of well known computing systems, environments, and/or configurations that may be suitable for implementing the invention include, but are not limited to, personal computers, server computers, laptop devices, multiprocessor systems, microprocessor-based systems, network PCs, minicomputers, mainframe computers, distributed computing environments that include any of the above systems or the like.

The invention may be described in the general context of computer-executable instructions, such as program modules, being executed by a computer. Generally, program modules include routines, programs, objects, components, data structures, etc. that perform a particular task or implement particular abstract data types. The invention may be also practiced in distributed computing environments where tasks are performed by remote processing devices that are linked through a communications network. In a distributed computing environment, program modules may be located in both local and remote computer storage media including memory storage devices.

With reference to FIG. 13, an exemplary system for implementing the invention includes a general purpose-computing device in the form of a computer 20. Components of a computer 20 include, but are not limited to, a processing unit 22, a system memory 24, and a system bus 27 that couples various system components including the system memory to the processor. The system bus may be any of several types of bus structures including a memory bus or memory controller, peripheral bus, and a local bus using any of a variety of bus architectures. By way of example, not limitation, such architectures include Industry Standard Architecture (ISA) normal capitalization bus, Micro Channel Architecture (MCA) bus, Enhanced ISA (EISA) bus, Video Electronics Standards Association (VESA) local bus, and Peripheral Component Interconnect (PCI) bus also known as a Mezzanine bus.

The computer 20 typically includes a variety of computer-readable media. Computer-readable media can be any available media that can be accessed by the computer 20 and includes both volatile and non-volatile media, removable and non-removable media. By way of example, and not limitation, computer-readable media may comprise computer storage media and communication media. Computer storage media includes, but is not limited to, RAM, ROM, EEPROM, flash memory or other memory technology, CD-ROM, Digital Versatile Disk (DVD) or other optical disk storage, magnetic cassettes, magnetic tape, magnetic disk storage or other magnetic storage devices, or any other medium which can be used to store the desired information and which can be accessed by the computer 20.

The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 24 includes computer storage media in the form of volatile and/or non-volatile memory such as read only memory (ROM) 28 and random access memory (RAM) 30. A basic input/output system 32 (BIOS), containing the basic routines that help to transfer information between elements within the computer 20, such as during start-up, is typically stored in ROM 28. RAM 30 typically contains data and/or program modules that are immediately accessible to and/or presently being operated on by the processing unit 22. By way of example, and not limitation, FIG. 13 illustrates an operating system 47, application programs 48, other program modules 50, and program data 52.

The computer 20 may also include removable/non-removable, volatile/non-volatile computer storage media. By way of example only, FIG. 13 illustrates a hard disk drive 37 that reads from or writes to non-removable, non-volatile magnetic media 38, a magnetic drive 38 that reads from or writes to a removable, non-volatile magnetic disk 40, and an optical disk drive 42 that reads from or writes to a removable, non-volatile optical disk 44, such as CD-ROM or other optical media. Other removable/non-removable, volatile/non-volatile computer storage media that can be used in the exemplary operating environment include, but are not limited to, magnetic tape cassettes, flash memory cards, DVD, digital video tape, Bernoulli cap cartridges, solid state RAM, solid state ROM, and the like. The hard disk drive 34, magnetic disk drive 38, and optical disk drive 42 may be connected to the system bus 27 by a hard disk drive interface 54, a magnetic disk drive interface 57, and an optical drive interface 58, respectively. Alternatively, the hard disk drive 34, magnetic disk drive 38, and optical disk drive 42 are typically connected to the system bus 27 by a Small Computer System Interface (SCSI).

The drives and their associated computer storage media discussed above and illustrated in FIG. 13, provide storage of computer-readable instructions, data structures, program modules and other data for the computer 20. In FIG. 13, for example, the hard disk drive 34 is illustrated as storing the operating system 47, application programs 48, other programs 50, and program data 52. Note that these components can either be the same as or different from the operating system 47, the other program modules 50, and the program data 52. A user may enter commands and information into the computer 20 through input devices such as a keyboard 70 and a pointing device 72, commonly referred to as a mouse, track ball or touch pad. Other input devices (not shown) may include a microphone, a joystick, a game pad, a satellite dish, a scanner, or the like. These and other input devices are often connected to the processing unit 22 through user input interface 74 and may be connected by other interface and bus structures, such as a parallel port, game port or other universal serial bus (USB).

The computer 20 may operate in a network environment using logical connections to one or more remote computers 75. The remote computer 75 may be a personal computer, a server, a router, a network PC, a peer device or other common network node, and typically includes many or all of the elements described above relative to the computer 20, although only a memory storage device has been illustrated in FIG. 13. The logical connections depicted in FIG. 13 include a local area network (LAN) 77 and a wide area network (WAN) 77, but also include other networks. Such network environments are commonplace in office, enterprise-wide computer networks, Intranets, and the Internet. One skilled in the relevant art will appreciate that the computer 20 may be configured such that at least one network connection is non-continuous. Accordingly, the computer 20 would be unable to communicate with the remote computer 75 throughout a period of time that the network connection is disabled. Such a configuration is described generally as an "off-line" configuration.

When used in a LAN network environment, the computer 20 is connected to the LAN 77 through a network interface adapter 78. When used in a WAN network environment, the computer typically includes a modem or other means for establishing communications over the WAN 78, such as the Internet. The modem, which may be internal or external, may be connected to the system bus 27 via the serial port interface or other appropriate mechanism. In a networked environment, program modules depicted relative to the computer 20, or portions thereof, may be stored in the remote memory storage device. By way of example, and not limitation, FIG. 13 illustrates remote application programs 48 as residing on memory device 24. It will be appreciated that the network connections shown are exemplary and other means of establishing communication between the computers may be used. Although many other internal components of the computer 20 are not shown, those of ordinary skill will appreciate that such components and their interconnection are well known. Accordingly, additional details concerning the internal construction of the computer 20 need not be disclosed in connection with the present invention.

Those skilled in the art will understand that program modules such as the operating system 47, the application programs 48 and data 52 are provided to the computer 20 via one of its memory storage devices, which may include ROM 28, RAM 30, hard disk drive 34, magnetic disk drive 38, or optical disk device 42. The hard disk drive 34 is used to store data 52 and the programs, including the operating system 47 and application programs 48.

When the computer 20 is turned on or reset, the BIOS 32, which is stored in ROM instructs the processing unit 22 to load the operating system from the hard disk drive 34 into the RAM 30. Once the operating system 47 is loaded into RAM 30, the processing unit executes the operating system code and causes the visual elements associated with the user interface of the operating system to be displayed on the monitor 71. When a user opens an application program 48, the program code and relevant data are read from the hard disk drive and stored in RAM 38.

As is appreciated by those skilled in the art, the World Wide Web (WWW) is a vast collection of interconnected or "hypertext" documents written in HTML or other markup languages, that are electronically stored at WWW sites throughout the Internet. A WWW site is a server connected to the Internet that has mass storage facilities for storing hypertext documents and that runs administrative software for handling requests for those stored hypertext documents. A hypertext document normally includes a number of hyperlinks that may be identified in various ways (e.g., highlighted portions of text) which link the document to other hypertext documents possibly stored at a WWW site elsewhere on the Internet. Each hyperlink is associated with a Uniform Resource Locator (URL) and provides the exact location of the linked document on a server connected to the Internet and describes the document. Thus, whenever a hypertext document is retrieved from any WWW server, the document is considered to be retrieved from the WWW. As is known to those skilled in the art, a WWW server may also includes facilities for storing and transmitting application programs, which is application programs written in the JAVA™ programming language from Sun Microsystems, for execution on a remote computer. Likewise a WWW server may also include facilities for executing scripts or other application programs on the WWW server itself.

A consumer or other remote user may retrieve hypertext documents from the WWW via a WWW browser application program. The WWW browser is a software application program for providing a graphical user interface to the WWW. Upon request from the consumer via the WWW browser, the browser accesses and retrieves the desired hypertext document from the appropriate WWW server using the URL for the document and a protocol known as a HyperText Transfer Protocol (HTTP). HTTP is a higher-level protocol than TCP/IP and is designed specifically for the requirements of the WWW. It is used on top of TCP/IP to transfer hypertext documents between servers and clients. The WWW browser may also retrieve application programs from the WWW server, such as JAVA™ applets, for execution on the client computer.

The present application is directed toward a method and system for implementing a dynamic declarative language processing method. More specifically, the present invention will be described in relation to a system and method for instantiating an interface object hierarchy from validated XML instance data. One skilled in the relevant art will understand that the present invention is not limited in its application for generating a user interface object hierarchy. Moreover, one skilled in the relevant art will understand that the present invention is also not limited to utilizing XML as a declarative language. Thus, it is to be understood that the disclosed embodiments are done by way of example and should not be construed as limiting.

Figure 4:
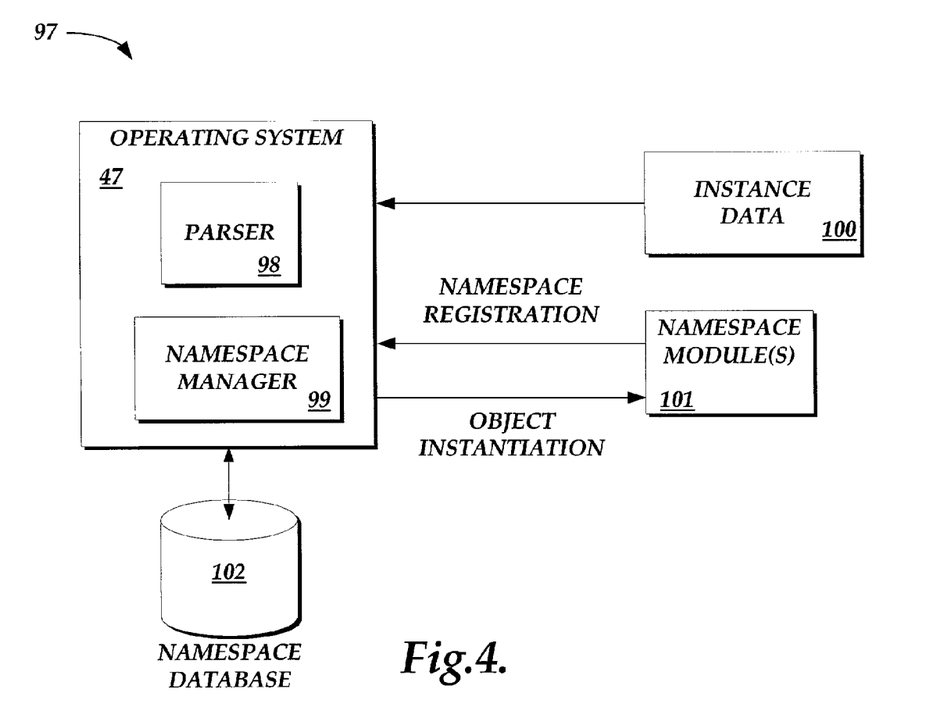
FIG. 4 is a block diagram illustrative of a processing system suitable for processing declarative language instance data in accordance with the present invention.

FIG. 4 is a block diagram illustrative of an XML processing system 97 suitable for processing XML instance data to generate a UI object hierarchy in accordance with the present invention. The XML processing system 97 includes a parser 98 and a namespace manager 99. In an actual embodiment of the present invention, the parser 98 is operable to obtain XML instance data 100 and parse the data into tag, attribute and value. One skilled in the relevant art will appreciate that as utilized in XML instance data 100, tags generally correspond to the identity of an object class and attributes correspond to one or more properties on an identified class. Values generally refer to a value of a cited attribute on instances of specific XML classes.

With continued reference to FIG. 4, the namespace manager 99 is generally operable to obtain the parsed instance data 100 from the parser 98. The namespace manager is further operable to validate the parsed instance data 100 according to a dynamically generate a class hierarchy from class definitions obtained from one or more namespace modules 101. The namespace manager 99 may maintain the class hierarchy in a namespace database 102, which may be remote from the namespace manager. The namespace manager 99 is further operable to generate object code that can be utilized to instantiate a desired display object hierarchy. One skilled in the relevant art will appreciate that object hierarchies refer generally to one or more classes, properties of the classes and values for the properties and relationship between the classes for an instantiation of user interface objects.

In accordance with the present invention, one or more software applications utilize a declarative language, such as XML, to instruction the operating system 47 to generate user interface objects. The software application transmits XML instance data 100 to the operating system. The XML instance data 100 refers to one or more namespace modules that contain the class definitions utilized in the instance data. The namespace modules include meta-data that define the relationship between the defined classes in the module and other classes in the class hierarchy. In addition to a default namespace module containing a common class hierarchy and available to various software applications, the software application may also refer to additional namespace modules that can define additional classes.

As the XML instance data 100 is received by the operating system 47, the parser 98 parses the instance data to identify tag, attribute and value data. The namespace manager 99 obtains the parsed data and validates the instance data 100 according to a dynamically maintained class hierarchy. If the instance data 100 refers to a namespace module already included in the class hierarchy, the data is validated. If the instance data 100 refers to a namespace module not previously included in the class hierarchy, the namespace manager obtains the namespace module and dynamically modifies the class hierarchy to include the additionally defined classes. Thereafter, the namespace manager 99 generates an object code corresponding to the validated instance data to instantiate an object hierarchy corresponding to the instance data.

Figure 5A:
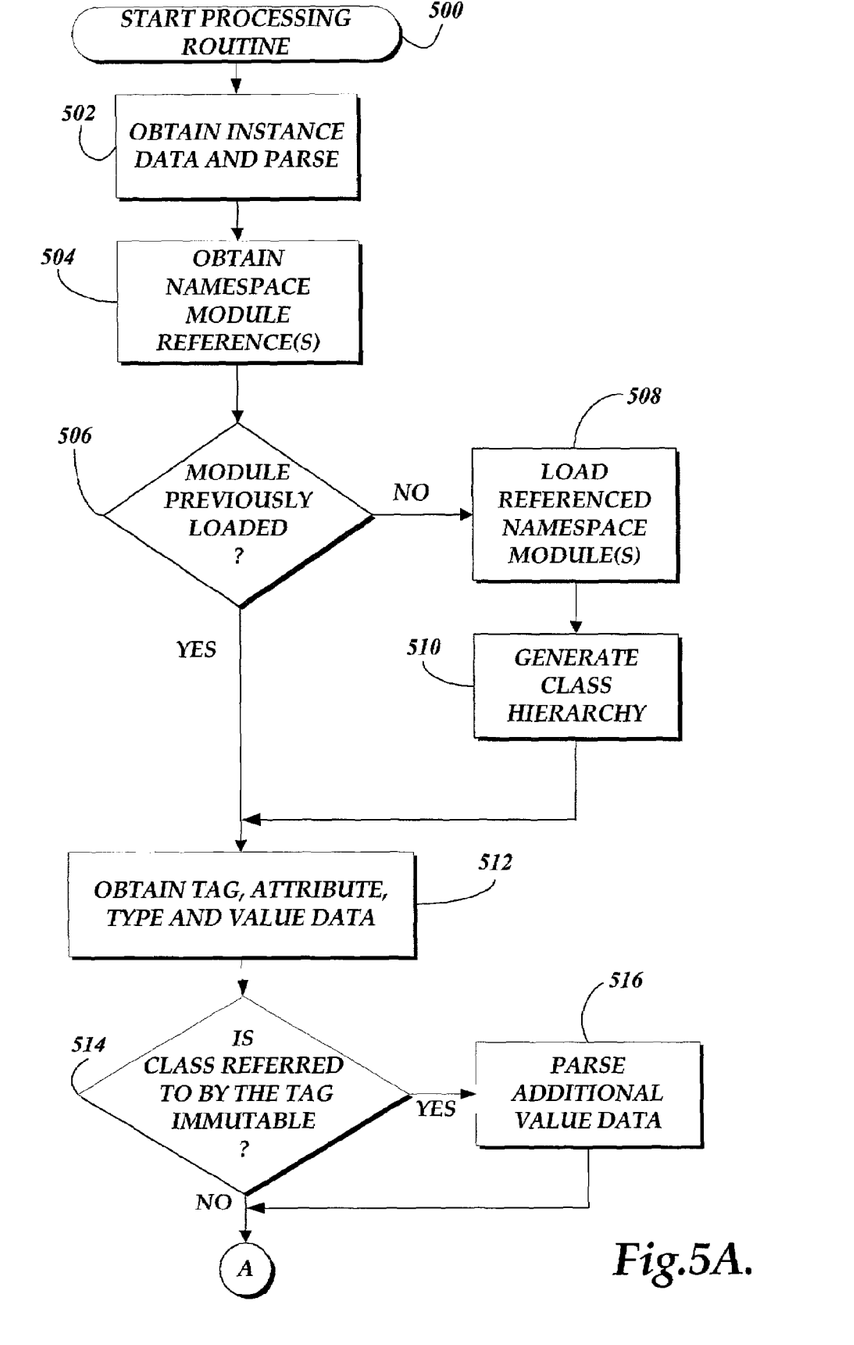
FIGS. 5A and 5B are flow diagrams illustrative of a declarative language instance data processing routine in accordance with the present invention.
Figure 5B:
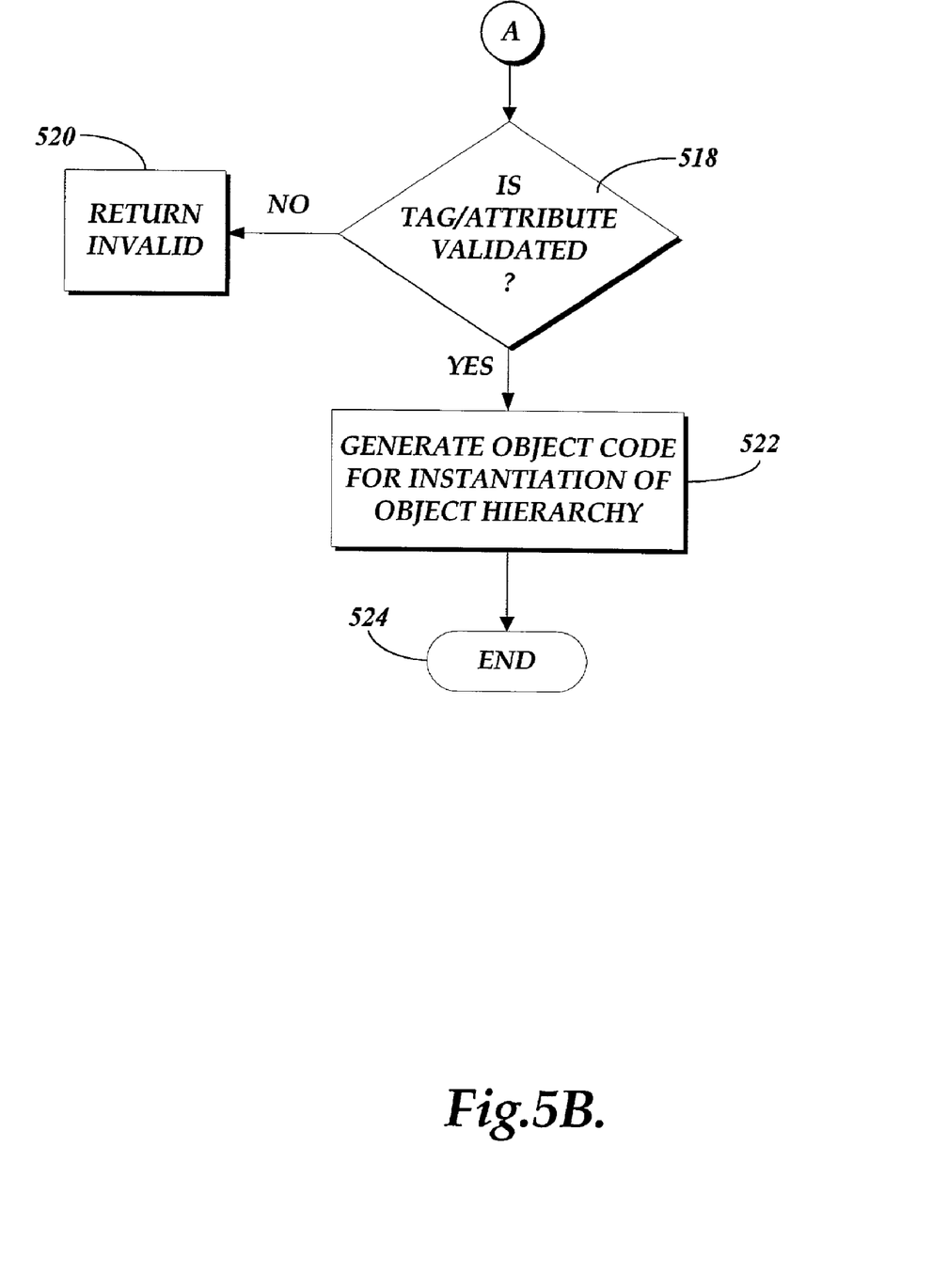

FIGS. 5A and 5B are flow diagrams illustrative of a XML instance data processing routine 500 implemented in accordance with the present invention. With reference to FIG. 5A, at block 502, the parser 98 obtains instance data 100 and parses the instance data. In an illustrative embodiment of the present invention, the parser 98 parses the instance data to obtain references to one or more namespace modules and to identify various tag, attribute and value data.

Figure 6:
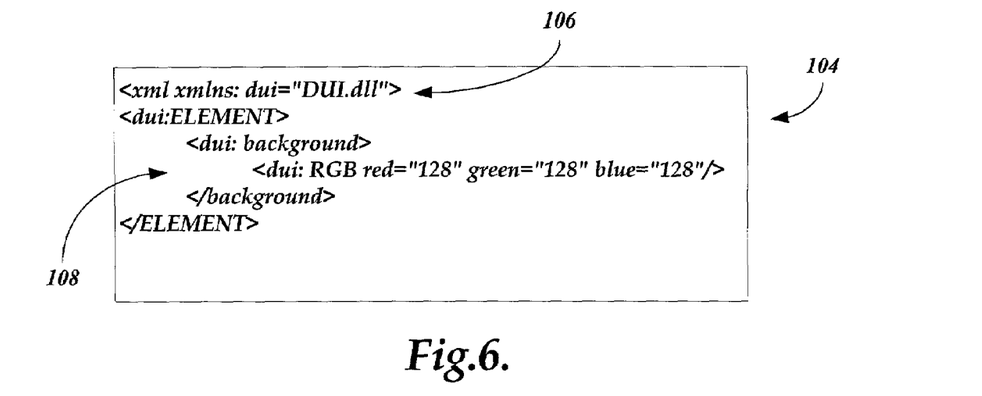
FIG. 6 is a block diagram illustrative of an instance data format for generating an object hierarchy in accordance with the present invention.

FIG. 6 is block diagram illustrative of a format 104 declaring XML instance data corresponding to a class hierarchy in accordance with the present invention. The XML instance data format 104 includes a namespace module registration portion 106 for listing one or more namespace modules that include the class definitions corresponding to the tag, attribute and value data in the instance data. As illustrated in FIG. 6, the namespace module registration portion 106 includes a reference to single namespace module called "DUI.dll." The XML instance data format 104 also includes a tag, attribute, and value portion 108 that will instruct the namespace manager 99 to creates instances of class objects defined by the namespace modules and to define some of the objects' properties. As illustrated in FIG. 6, the tag, attribute and value portion 108 creates an instance of an ELEMENT object and then includes attribute data that will define a "background" property of the instantiated object. In the illustrative embodiment of the present invention, the XML instance data format 104 defines the "property" attribute value in terms of a type, "RGB", which declares a type of value that the attribute is being defined. Finally, the XML instance data format 104 also includes a value for the type, "'red=128' 'green=128' ' blue=128.'" It will be understood by one skilled in the relevant art that XML instance data 100 does not require type data, and that an attribute may be defined directly specification of a value for an attribute in the XML instance data.

Returning to FIG. 5A, at block 504, the namespace manager 99 obtains a reference to one or more of the referenced namespace modules in the XML instance data 100 from the parser 98. At decision block 506, a test is done to determine whether the namespace manager 99 has previously loaded the referenced namespace module(s). If the namespace module has already been loaded, it is assumed that the namespace manager 99 has previously generated a valid class hierarchy and the routine 500 proceeds to block 512, which will be described below. On the other hand, if the namespace module has not previously loaded the referenced namespace module, at block 508, the referenced namespace module is loaded. Once the namespace module has been loaded at block 508, at block 510, the namespace manager 99 generates a class hierarchy according to the meta-data included in the loaded namespace modules. The meta-data defines various characteristics of the class within the class hierarchy. In an actual embodiment of the present invention, the meta-data includes a definition of a class name and its various properties. Additionally, the meta-data includes a definition of a superclass within the class hierarchy and a definition of valid children (object classes) that can be validly instantiated in a resulting object hierarchy.

For example, a class hierarchy can be generated from the definitions included in a namespace module, termed "DUI.dll," as illustrated below.

```
Module DUI.dll
{
class ELEMENT
superclass: none
properties:
  parent
  background
  foreground
valid children: ELEMENT
class BUTTON
superclass: ELEMENT
properties: pressed
valid children: null
class EDIT
superclass: ELEMENT
properties: null
valid children: null
class SELECTOR
superclass: ELEMENT
properties: null
valid children: null
class REPEAT BUTTON
superclass: BUTTON
properties: speed
valid children: null
}
```

Figure 7:
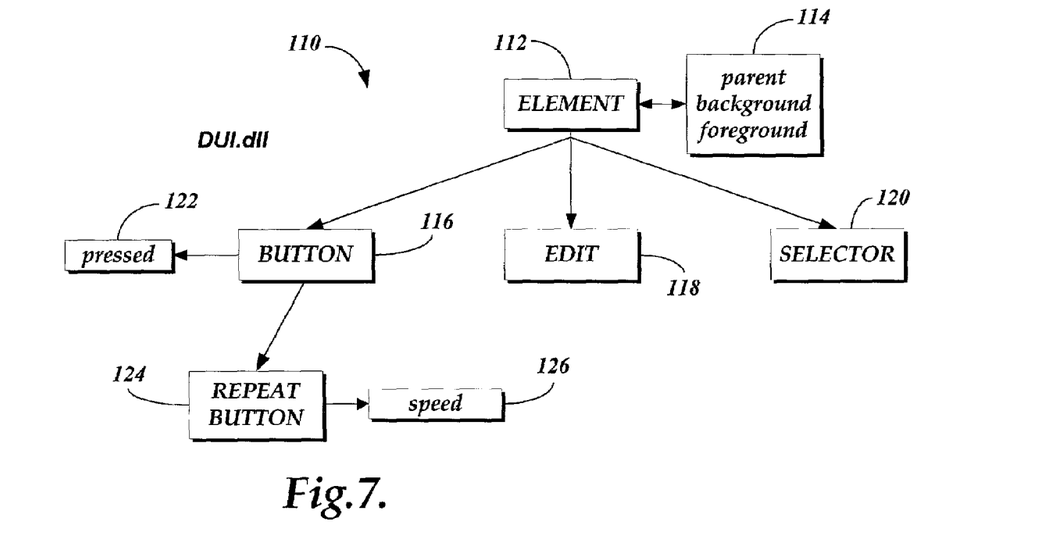
FIG. 7 is a block diagram illustrative of a user interface object class hierarchy in accordance with the present invention.

FIG. 7 is a block diagram illustrative of a class hierarchy 110 generated from the meta-data included in the namespace module "DUI.dll" illustrated above. As illustrated in FIG. 7, the class hierarchy includes a root class 112, labeled "ELEMENT," that includes one more properties 114. In the illustrative embodiment of the present invention, the root class 112 has a "parent," "background," and "foreground" property that may be defined. The root class 112 has three subclasses 116, 118, 120, labeled "BUTTON", "EDIT" and "SELECTOR". Class 116 has a "pressed" property 122. Additionally, class 116 has a sub-class 124, labeled "REPEAT BUTTON," that has a "speed" property 126. One skilled in the relevant art will understand that each class in the class hierarchy 110 inherits the properties of its superclass and passes its defined properties to its subclass. For example, classes 116, 118, and 120 inherit the properties 114 from the root class 112.

Figure 8:
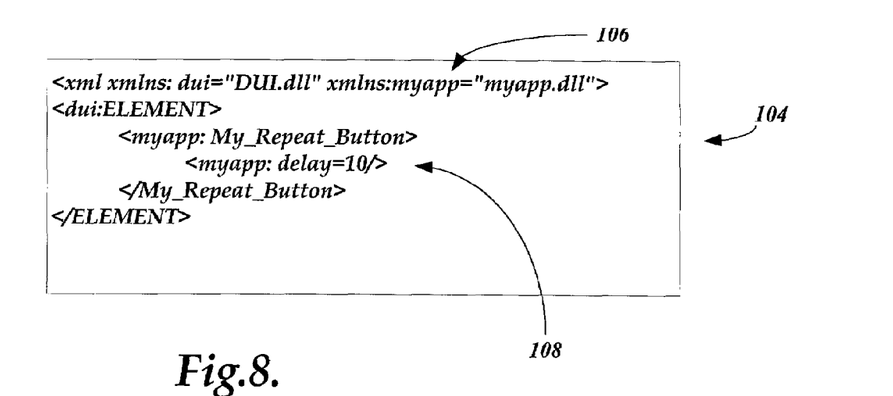
FIG. 8 is a block diagram of an instance data format illustrating the specification of tag, attribute and value data for an extended class in accordance with the present invention.

In an illustrative embodiment of the present invention, the XML instance data 100 processed at block 510 may include references to one or more namespace modules that "extend" another class hierarchy, such as class hierarchy 110, by defining additional classes. FIG. 8 is a block diagram of XML instance data format 104 that includes data referencing one or more classes of an extended class hierarchy. As illustrated in FIG. 8, the namespace module registration portion 106 includes references to two namespace modules, "DUI.dll," described above, and "Myapp.dll." In this illustrative embodiment of the present invention, the tag, attribute and value portion 108 instructions for the namespace manager 99 to create instances of the "ELEMENT" class and to define some of the objects' properties. More specifically, the tag, attribute and value portion 108 defines an attribute value of "10" for the "delay" attribute of the extended class object "My_Repeat_Button."

The class hierarchy 110 may be extended by definitions included in a namespace module, "My App.dll," as illustrated below.

Module MyApp.dll
{
class My_Repeat_Button
superclass: DUI.dll's class REPEAT BUTTON
properties: delay
valid children: null
}

Figure 9:
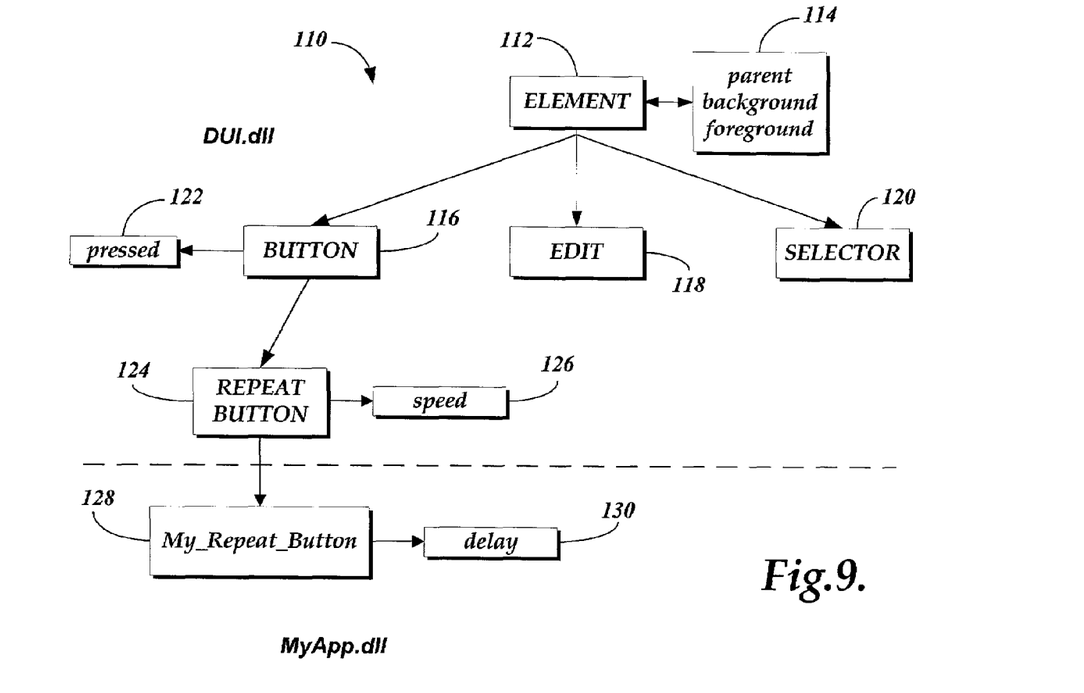
FIG. 9 is a block diagram of the class hierarchy of FIG. 7 illustrating an extended class in accordance with the present invention.

FIG. 9 is a block diagram of the class hierarchy 110 of FIG. 7 illustrating an embodiment in which an additional class is added. As illustrated in FIG. 9, class 128, labeled "My_Repeat_Button," has been added as a sub-class of class 124. Class 128 defines an additional "delay" property 130. Additionally, as previously discussed, class 128 would also inherit all the properties from its superclass, class 124. Thus, the original class hierarchy information 110 would be obtained from a first namespace module, while the additional class information for class 128 would be obtained from a second namespace module. However, unlike some conventional processing methods, the second namespace module does not have to define every class in the class hierarchy and does not necessarily become invalid if the first namespace module modifies the class hierarchy.

Returning to FIG. 5A, after a class hierarchy has been generated at block 510, or if a class hierarchy already exists, at block 512, the namespace manager 99 obtains the tag, attribute and value data from the parser 98. One skilled in the relevant art will appreciate that the parser 98 may transfer both namespace module registration information and the tag, attribute and value data in a single transfer. Alternatively, the parser 98 may transfer the data upon request from the namespace manager 99. At decision block 514, a test is conducted to determine whether the class is mutable. If the class is not mutable, the attribute values must be specified at the time the object is instantiated. If the class is mutable, the object can be instantiated from the class and the value can be set later, as illustrated at block 516. Referring again to FIG. 6, the "RGB" type specified in the tag, attribute and value portion 108 data is non-mutable because it requires additional processing to identify the value being specific for the attribute. Thus, the namespace manager 99 parses the "RGB" type to process the declaration of the red, green and blue values.

Turning now to FIG. 5B, at decision block 518, a test is done to determine whether the tag, attribute and value data in the XML instance data 100 is valid. In an actual embodiment of the present invention, a test is conducted to determine whether the string recited in the XML instance data corresponds to the definitions provided by the dynamically generated class hierarchy 110. If the XML instance data cannot be validated, at block 520, a not valid indication is returned. If the XML instance data is validated, at block 522, the XML instance data is valid and an object code utilized to instantiate an object hierarchy is returned. The object code will be explained in greater detail below. At block 524, the routine 500 terminates.

Figure 10:
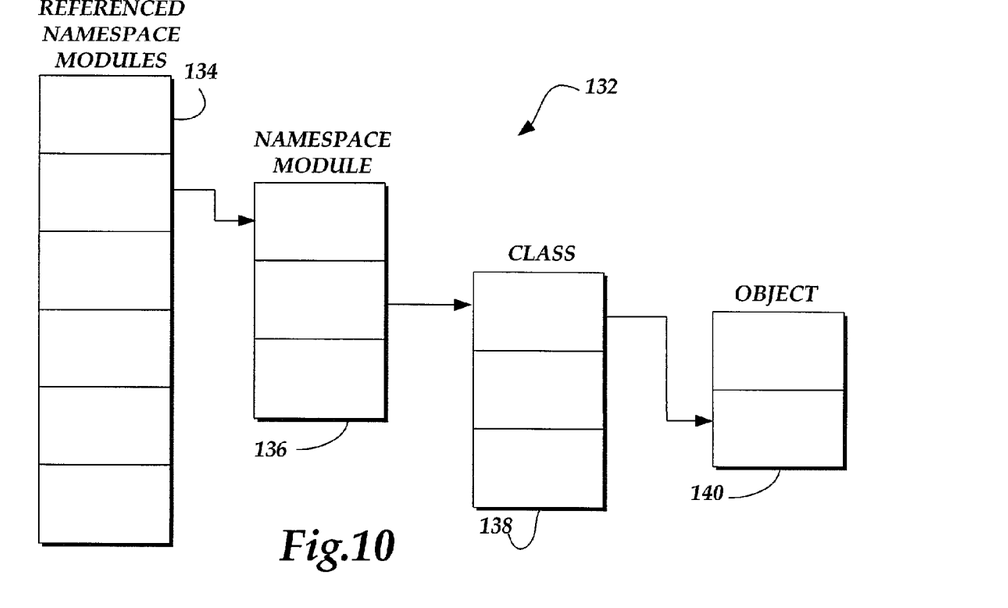
FIG. 10 is a block diagram of a namespace table for generating object code in accordance with the present invention.
Figure 11:
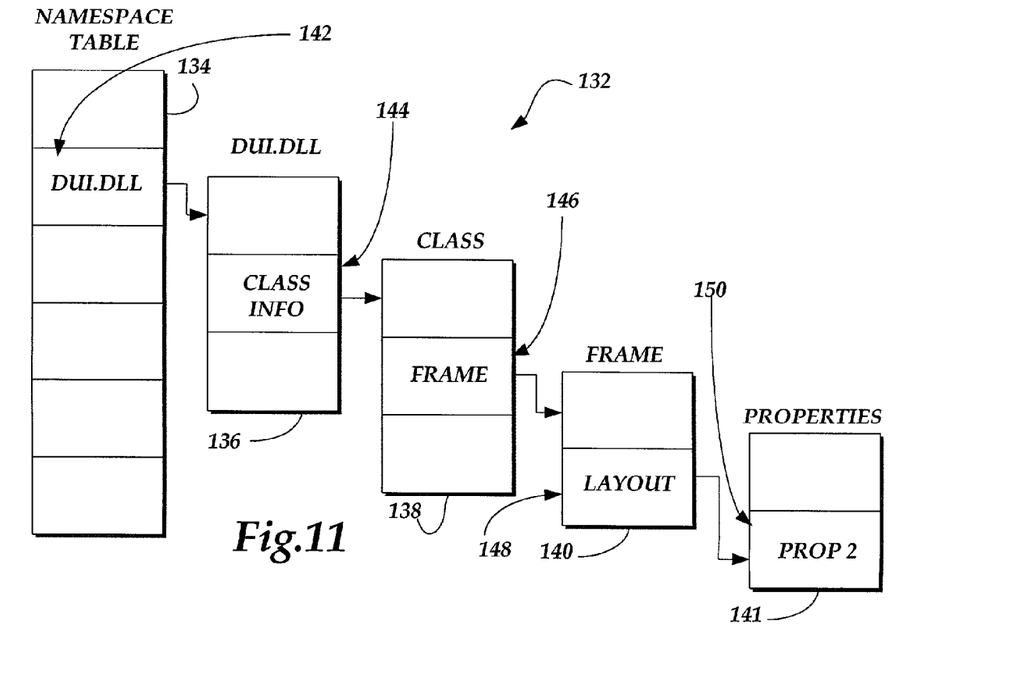
FIG. 11 is the namespace table of FIG. 10 illustrating the traversal of the table according to instance data in accordance with the present invention.

In accordance with an aspect of the present invention, the namespace manager 99 validates the XML instance data 100 and returns a code for instantiating objects in a UI object hierarchy having properties and values corresponding to the attributes and values specified in the instance data. FIGS. 10 and 11 are block diagrams illustrative of a namespace table 132 utilized to store the dynamically generated class hierarchy (block 510, FIG. 5A) and to generate a unique object code to instantiate the UI objects. With reference to FIG. 4, the namespace table 132 may be maintained in the namespace database 102.

With reference now to FIG. 10, the namespace table 132 includes a referenced namespace modules table 134 that includes a listing of all the namespace modules 101 that have been referenced and loaded by the namespace manager 99. Each entry in the referenced namespace modules table 134 includes a pointer to a namespace module table 36 corresponding to a particular referenced namespace module.

The namespace module table 136 includes a pointer to a class identifier table 138 that includes listing of all the classes associated with the particular namespace module. The class identifier table 138 includes pointers to an object table 140 that are objects of the class. Furthermore, each object table 140 may also include further links that define the properties of the objects.

In accordance with the present invention, the population of the namespace table 132 with information from the instance data 100 and the namespace modules 101 allows the namespace manager 99 to generate unique object codes for instantiation. More specifically, an object code is a fixed length number that represents a traversal through the namespace table. For example, in an illustrative embodiment of the present invention, each object code is 32-bit binary number. However, one skilled in the relevant art will appreciate that the object code may be any bit size, depending on the implementation of the object code, the requirements of the operating environment, and the like. Equation (1) illustrates such a code.

(1) xxxxxxxxxxxx

Each bit, or groups of bits, is indicative of values of the various tables in the namespace table 132. For example, in the illustrative embodiment of the present invention, the three most significant bits of the object code are reserved for identifying which record in the referenced namespace modules table 134 is being referenced. Equation (2) illustrates an object code in which the second record in the referenced namespace modules table 134 is being referenced.

(2) 010xxxxxxxxx

Continuing on, in an illustrative embodiment, the next three most significant bits may be utilized to identify which record in the namespace module table 136 points to a referenced class. Equation (3) illustrates an object code in which the third record in the namespace module table 136 is being referenced. Note that the previous reference to the record pointing to the namespace module is preserved.

(3) 010011xxxxxx

In accordance with the present invention, the process continues until the namespace manager 99 has processed the tag, attribute, and value data included in the XML instance data. Thus, walking through the namespace table 132 allows the namespace manager 99 to validate the XML instance data 100 and in turn to generate the unique object code that creates the instance of the object.

FIG. 11 is a block diagram of the namespace table 132 illustrating the generation of object code for XML instance data. In an illustrative embodiment, it will be assumed that the instance data 100 specifies a "Prop 2" value for a "Layout" property of a "Frame" class with a "DUI.dll" namespace module. As illustrated in FIG. 11, the referenced namespace module table 134 includes a pointer to the "DUI.dll" namespace table 136 at record 142. This correlates to the second record in the referenced namespace module table 136, which would be placed in the three most significant bits of the object code word. The namespace module table 136 includes a pointer to a class information table 138 at 144, the location of which would be noted in the object code.

Continuing, the class information table 138 includes a pointer to an object table 140, indicative of a "Frame" object at 146, the location of which is also noted in the object code. The object table 140 includes a pointer to a "Layout" properties table 141 at 150, which is further placed in the object. Upon traversing the namespace table 132, the XML instance data is validated and an object code word embodying an object corresponding to the XML instance data is generated.

By generating object code, the present invention facilitates the instantiation of an object hierarchy corresponding to XML instance data. Moreover, by utilizing a fixed length object code, the present invention further facilitates the uniqueness of each object instantiation.

Figure 12:
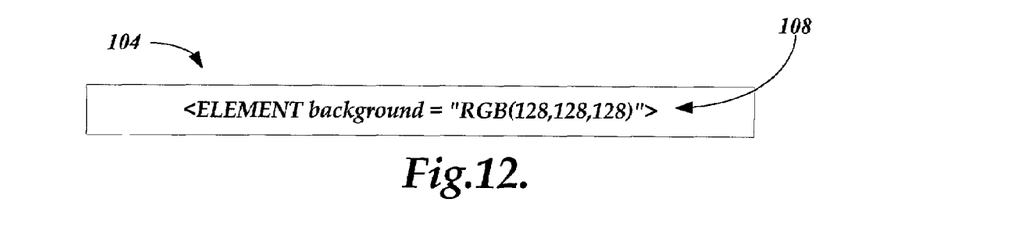
FIG. 12 is illustrative of an alternative format for specifying XML instance data in accordance with the present invention.

In another aspect of the present invention, the validation engine may also utilize a shorthand version of XML instance data 100. FIG. 12 is illustrative of a short-hard representation of the XML instance data 100 of FIG. 6. It will be appreciated that the short-hand version provides the same functionality and facilitates the specification of XML instance data. However, the instance data 100 only includes the tag, attribute, and value portion 108 and does not include a namespace module registration portion 106. Instead, it is assumed that all references to classes are from namespace modules already loaded by the namespace manager 99.

While illustrative embodiments of the invention have been illustrated and described, it will be appreciated that various changes can be made therein without departing from the spirit and scope of the invention.

The invention claimed is:

1. A method for dynamically processing declarative language instance data, the method comprising:
   obtaining instance data, the instance data including a reference to one or more namespace modules and tag, attribute and value data;
   obtaining the one or more namespace modules referenced in the instance data;
   generating a class hierarchy from meta-data included in the one or more namespace modules;
   validating the tag, attribute and value data according to the class hierarchy; and
   generating an object code, wherein the object code operable to instantiate an object hierarchy corresponding to the tag, attribute and value data of the instance data and wherein the object code is a 32-bit word, the 32-bit word including a portion indicative of the referenced namespace module and a class attribute.

2. The method as recited in claim 1, wherein the meta-data includes one or more class definitions, wherein the class definitions include a class name field, one or more class property fields, and a superclass field.

3. The method as recited in claim 2, wherein the meta-data includes a valid children field.

4. The method as recited in claim 1, wherein generating a class hierarchy includes generating a namespace table corresponding to the class hierarchy.

5. The method as recited in claim 4, wherein the namespace table includes a referenced namespace modules table, one or more namespace module tables, and one or more class information tables, wherein the namespace module tables are linked to the referenced namespace modules table and wherein the class information tables are linked to the one or more namespace module tables.

6. The method as recited in claim 5, wherein the namespace table includes one or more object tables, wherein the object tables are linked to the one or more class information tables.

7. The method as recited in claim 1, wherein the three most significant bits of the 32-bit word are indicative of the referenced namespace module.

8. The method as recited in claim 1, wherein the declarative language instance data is XML instance data.

9. The method as recited in claim 1, wherein the object hierarchy is a user interface object hierarchy.

10. A computer-readable medium having computer-executable instructions for performing the method recited in claim 1.

11. A computer system, the computer system having a processor, a memory and an operating environment, the computer system operable for performing the method recited in claim 1.

12. A system for processing declarative language instance data including a reference to one or more namespace modules and tag, attribute and value data, the system comprising:
   a parser operable to obtain and parse the instance data; and
   a namespace manager operable to obtain and process the parsed instance data;
   wherein the namespace manager processes the parsed instance data by validating the tag, attribute and value data and generating an object code corresponding to the validated tag, attribute and value data and wherein the object code is a 32-bit word, the 32-bit word including a portion indicative of the referenced namespace module and a class attribute.

13. The system as recited in claim 12, wherein the namespace manager is further operable to generate a class hierarchy from meta-data in the one or more namespace modules.

14. The system as recited in claim 12, wherein the meta-data includes one or more class definitions, wherein the class definitions include a class name field, one or more class property fields, and a superclass field.

15. The system as recited in claim 14, wherein the meta-data includes a valid children field.

16. The system as recited in claim 12, wherein the namespace manager is further operable to generate a namespace table corresponding to the class hierarchy to validate the tag, attribute and value data.

17. The system as recited in claim 16, wherein the namespace table includes a referenced namespace modules table, one or more namespace module tables, and one or more class information tables, wherein the namespace module tables are linked to the referenced namespace modules table and wherein the class information tables are linked to the one or more namespace module tables.

18. The system as recited in claim 17, wherein the namespace table includes one or more object tables, wherein the object tables are linked to the one or more class information tables.

19. The system as recited in claim 12, wherein the object code is a fixed length number indicative the tag, attribute and value data from the instance data.

20. The system as recited in claim 12, wherein the three most significant bits of the 32-bit word are indicative of the referenced namespace module.

21. The system as recited in claim 12, wherein the declarative language instance data is XML instance data.

22. The system as recited in claim 12, wherein the object hierarchy is a user interface object hierarchy.

23. A method for processing declarative language instance data, the method comprising:
  issuing, by an application process, instance data, the instance including a reference to one or more namespace modules and tag, attribute and value data;
  obtaining, by a dynamic processing process, the instance data;
  obtaining, by the dynamic processing process, the one or more namespace modules referenced in the instance data;
  generating, by the dynamic processing process, a class hierarchy from meta-data included in the one or more namespace modules;
  validating, by the dynamic processing process, the tag, attribute and value data according to the class hierarchy;
  generating, by the dynamic processing process, an object code, the object code operable to instantiate an object hierarchy corresponding to the tag, attribute and value data of the instance data, wherein the object code is a 32-bit word, the 32-bit word including a portion indicative of the referenced namespace module and a class attribute; and
  obtaining, by the application process, the object code; and
  instantiating, by the application process, an object hierarchy corresponding to the object code generated by the dynamic processing process.

24. The method as recited in claim 23, wherein the meta-data includes one or more class definitions, wherein the class definitions include a class name field, one or more class property fields, and a superclass field.

25. The method as recited in claim 24, wherein the meta-data includes a valid children field.

26. The method as recited in claim 23, wherein generating a class hierarchy includes generating a namespace table corresponding to the class hierarchy.

27. The method as recited in claim 23, wherein the namespace table includes a referenced namespace modules table, one or more namespace module tables, and one or more class information tables, wherein the namespace module tables are linked to the referenced namespace modules table and wherein the class information tables are linked to the one or more namespace module tables.

28. The method as recited in claim 27, wherein the namespace table includes one or more object tables, wherein the object tables are linked to the one or more class information tables.

29. The method as recited in claim 23, wherein the object code is a fixed length number indicative the tag, attribute and value data from the instance data.

30. The method as recited in claim 23, wherein the three most significant bits of the 32-bit word are indicative of the referenced namespace module.

31. The method as recited in claim 23, wherein the declarative language instance data is XML instance data.

32. The method as recited in claim 23, wherein the object hierarchy is a user interface object hierarchy generated by the application process.

33. A computer-readable medium having computer-executable instructions for performing the method recited in claim 23.

34. A computer system, the computer system having a processor, a memory and an operating environment, the computer system operable for performing the method recited in claim 23.

* * * * *